United States Patent [19]
Krause

[11] Patent Number: 5,056,752
[45] Date of Patent: Oct. 15, 1991

[54] MULTIDIRECTIONAL BRACING DEVICE

[76] Inventor: Theodore Krause, 203 Mariners Way, Copaigue, N.Y. 11726

[21] Appl. No.: 334,349

[22] Filed: Apr. 7, 1989

[51] Int. Cl.$^5$ .............................................. B47B 97/00
[52] U.S. Cl. .................................. 248/500; 248/220.1; 248/300
[58] Field of Search ...................... 248/503, 500, 220.1, 248/300; 403/205, 403, 231

[56] References Cited

U.S. PATENT DOCUMENTS

| | | | |
|---|---|---|---|
| 3,388,892 | 6/1968 | Case | 256/24 X |
| 3,966,056 | 6/1976 | Carson | 248/220.1 X |
| 4,273,477 | 6/1981 | Murphy | 248/300 X |

FOREIGN PATENT DOCUMENTS

| | | | |
|---|---|---|---|
| 816749 | 8/1951 | Fed. Rep. of Germany | 403/231 |
| 1297895 | 12/1962 | France | 403/231 |
| 109409 | 12/1943 | Sweden | 403/231 |
| 155947 | 9/1956 | Sweden | 248/503 |
| 7494 | of 1910 | United Kingdom | 403/231 |

Primary Examiner—Alvin C. Chin-Shue
Attorney, Agent, or Firm—Michael I. Kroll

[57] ABSTRACT

A multidirectional bracing device comprising a first angle having a substantially flat connecting plate and a substantially flat supporting plate member with a plurality of throughgoing attachment holes oriented approximately perpendicular to the connecting plate and a bracing plate attached on the back surface of the connecting plate approximately perpendicular to the connecting plate so that the connecting plate and the bracing plate form mutually perpendicular bracing surfaces. The bracing plate may be part of a second angle piece which is welded to the connecting piece of the first angle piece.

3 Claims, 1 Drawing Sheet

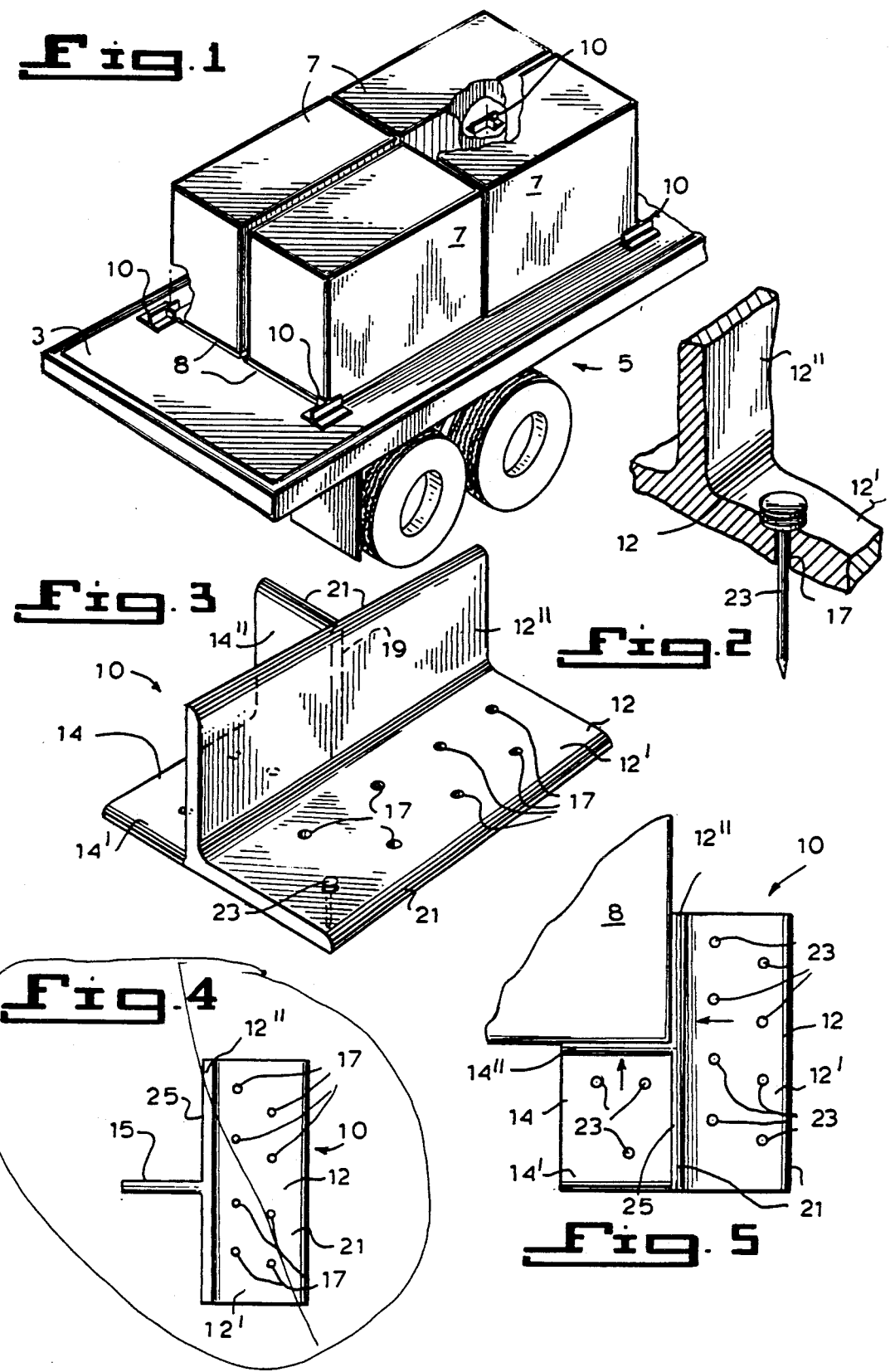

MULTIDIRECTIONAL BRACING DEVICE

THE FIELD OF THE INVENTION

The instant invention relates to a device for securing a pallet, a skid or a rack to a flat bed of a truck, railroad car, or the like.

THE BACKGROUND OF THE INVENTION

Cargo containers are often transported by truck and by railroad car. They are secured on the flat bed of the truck or railroad car on a pallet, for example. This method requires securing the pallets against both lateral and longitudinal movements. Currently this is done using attaching a group of 2×4s to the flat bed by nails for example. Each 2×4 prevents either lateral movement or longitudinal movement but not both, depending on its orientation.

It is an object of the present invention to provide a device for securing a pallet, skid or rack on the flat bed of a truck or the like and which simultaneously prevents lateral and longitudianl motion.

It is also an object of the present invention to provide an economically-made device for securing a pallet, skid, or rack on the flat bed of a truck and which is simple to use and simultaneously prevents both lateral and longitudinal movement.

It is another object of the present invention to provide a for securing a pallet, rack and/or skid on the flat bed of a truck or railroad car and preventing both longitudinal and lateral movement and which may be easily detached and reattached for use with a different configuration of pallets, racks and/or skids for a different group of cargo containers.

SUMMARY OF THE INVENTION

According to the present invention a multidirectional bracing device, comprises a first angle piece having a substantially flat connecting plate and a substantially flat supporting plate, the substantially flat supporting plate has a plurality of throughgoing attachment holes oriented approximately perpendicular to the connecting plate; and a second angle piece having another substantially flat connecting plate connected approximately perpendicular to another substantially flat supporting plate which also has a plurality of throughgoing attachment holes, a plurality of lateral edges of one side of the second angle piece are attached to the connecting plate of the first angle piece so that the bracing device and the supporting plates sit flat on a flat surface such as the flat bed of a truck.

All attachment mentioned above may be made by welding. All free edges of the bracing device may be rounded for safety. Also the connecting plates and the supporting plates are advantageously rectangular.

The multidirectional bracing device may be easily and quickly nailed in place with double-headed nails to a flat bed of a truck to hold a pallet, rack or skid in place. Quick removal of the bracing devices can be made because a claw hammer can be used to remove the double-headed nails.

BRIEF DESCRIPTION OF THE DRAWING FIGURES

FIG. 1 is perspective view of a group of cargo containers on pallets on a truck held in place by a plurality of multidirectional bracing devices according to the invention.

FIG. 2 is a cutaway sectional view of a multidirectional bracing device according to the present invention showing how it is attached to the flat bed with a double-headed nail.

FIG. 3 is a perspective view of one embodiment of a multidirectional bracing device according the present invention.

FIG. 4 is a top plan view of the multidirectional bracing device of FIG. 3 acting to brace a pallet.

DETAILED DESCRIPTION OF THE PREFERRED EMBODIMENT

A perspective view of the multidirectional bracing device 10 is shown in FIG. 3. The bracing device 10 comprises two angle pieces 12 and 14 which are attached together, advantageously by welding. The first angle piece 12 has a flat supporting plate 12' and a flat connecting plate 12" approximately perpendicular to each other. The second angle piece 14 similarly has a supporting plate 14' and a connecting plate 14" disposed approximately perpendicular to each other. The second angle piece 14 with the flat connecting plate 14" is attached at its lateral abutting edge 19 with the back surface 25 of the flat connecting plate 12" so that the connecting plate 14" is approximately perpendicular to the connecting plate 12". Similarly the flat supporting plate 14' is attached to the lower back surface 25 of the connecting plate 12" so that both the supporting plate 12' and the supporting placed 14' sit flat on the flat bed 3 when they are place on it or on any other flat surface and 12 and 12". The bracing device 10 thus forms an arrangement of mutually perpendicular vertical bracing surface for longitudinal and lateral bracing.

A plurality of attachment holes 17 for an attaching means are provided in the flat supporting plates 14' and 12' of the bracing device 10, shown in FIG. 3. The attaching means are advantageously a double-headed nail 23, shown in FIG. 2, in the attachment hole 17. Thus the bracing device 10 can be quickly secured in position on the wooden flat bed 3 driving the double-headed nails 23 in the attachment holes 17. Additionally, the double-headed nails 23 can be quickly removed with a claw hammer when the bracing device 10 is moved for unloading and moving the pallets 8 is desired. FIG. 4 shows the multidirectional bracing device 10 in operation, holding a pallet 8 in place although the double-headed nails 23 have been omitted from the FIG. 4 for clarity. The corner of the pallet 8 fits in the corner of the bracing device 10 formed by the connecting plate 12" and the connecting plate 14". The bracing forces of the bracing device 10 is illustrated by the arrows as being both lateral and longitudinal.

FIG. 1 shows four bracing devices 10 holding the four pallets 8 in place by engaging and holding the corners of the four pallets 8. The four bracing devices 10 are nailed in place with the double-headed nails 23. Other attachment devices may be necessary and have not been illustrated for simplicity. On the other hand when the cargo containers 7 are to be removed the bracing devices 10 must first be removed by pulling the double-headed nails 23 out with a claw hammer.

The free edges 21 of the bracing device 10 may be rounded to reduce cuts and other injuries.

LIST OF REFERENCE PARTS 3 flat bed 5 truck
7 cargo container
10 multidirectional bracing device of the present invention
12 first angle piece
12' supporting plate
12" connecting plate
14 second angle piece
14' supporting plate
14" connecting plate
17 attachement holes
19 lateral abutting edge of second angle piece
21 rounded plate edges
23 double-headed nail
25 back surface of connecting plate 12

It will be understood that each of the elements described above, or two or more together, may also find a useful application in other devices differing from the type of device described above.

The invention is not intended to be limited to the details provided above and it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed is new and what is desired to be protected by Letters Patent is set forth in the following claims:

1. A multidirectional bracing device, comprising,
   a) a first angle piece having a substantially flat first supporting plate containing a first plurality of aligned throughbores and a substantially flat first connecting plate formed substantially perpendicular to said substantially flat first supporting plate, said substantially flat first connecting plate having a back surface with an approximate center and being of one homogeneous piece with said substantially flat first supporting plate; and
   b) a second angle piece having a substantially flat second supporting plate containing a second plurality of aligned throughbores and a substantially flat second connecting plate formed substantially perpendicular to said substantially flat second supporting plate, said substantially flat second connecting plate having a lateral abutting edges and being of one homogeneous piece with said subtantially flat second supporting plate, said lateral abutting edge of said second angle piece attached to said back surface of said substantially flat first connecting plate so that said substantially flat first supporting plate and said substantially flat second supporting plate sit flat on a flat surface and said substantially flat second connecting plate being substantially perpendicular to said substantially flat first connecting plate and disposed at said approximate center of said back surface of said substantially flat first connecting plate wherein said back surface of said first connecting plate and said second connecting plate define a through opening to allow a corner of a pallet to sit flat on said flat surface within said through opening.

2. The multidirectional bracing device according to claim 1 in which said connecting plates and said supporting plates are substantially rectangular.

3. The multidirectional bracing device according to claim 2 in which said first angle piece is attached to said second angle piece by welding.

* * * * *